(12) United States Patent
Cox et al.

(10) Patent No.: US 7,970,909 B1
(45) Date of Patent: Jun. 28, 2011

(54) METHOD AND SYSTEM FOR ASSOCIATING CONCURRENT TELEPHONE AND DATA NETWORK SESSIONS

(75) Inventors: Richard Vandervoort Cox, New Providence, NJ (US); Benjamin J. Stern, Morris Township, Morris County, NJ (US); Jay Wilpon, Warren, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 970 days.

(21) Appl. No.: 11/473,355

(22) Filed: Jun. 22, 2006

(51) Int. Cl.
*G06F 15/16* (2006.01)

(52) U.S. Cl. .................................. 709/227; 709/203

(58) Field of Classification Search .................. 709/227, 709/203
See application file for complete search history.

(56) References Cited

U.S. PATENT DOCUMENTS

| | | | |
|---|---|---|---|
| 6,185,617 B1 * | 2/2001 | Housel et al. ................. 709/227 |
| 6,807,529 B2 | 10/2004 | Johnson et al. | |
| 6,912,581 B2 | 6/2005 | Johnson et al. | |
| 6,922,411 B1 | 7/2005 | Taylor | |
| 7,042,879 B2 * | 5/2006 | Eschbach et al. ............. 370/392 |
| 7,043,752 B2 | 5/2006 | Royer et al. | |
| 7,225,464 B2 * | 5/2007 | Satyavolu et al. ............. 726/10 |
| 7,281,043 B1 * | 10/2007 | Davie ............................. 709/226 |
| 2002/0073041 A1 * | 6/2002 | Kumhyr ........................... 705/64 |
| 2003/0065723 A1 * | 4/2003 | Kumhyr et al. ................ 709/206 |
| 2003/0086390 A1 * | 5/2003 | Eschbach et al. ............. 370/329 |
| 2003/0110266 A1 * | 6/2003 | Rollins et al. ................. 709/227 |
| 2003/0187944 A1 | 10/2003 | Johnson et al. | |
| 2003/0191964 A1 * | 10/2003 | Satyavolu et al. ............. 713/201 |
| 2003/0218627 A1 * | 11/2003 | Gusler et al. .................. 345/736 |
| 2004/0034707 A1 | 2/2004 | Royer | |
| 2004/0151186 A1 * | 8/2004 | Akama ....................... 370/395.3 |
| 2005/0130645 A1 * | 6/2005 | Dobson et al. ................ 455/423 |
| 2005/0165719 A1 * | 7/2005 | Greenspan et al. ................ 707/1 |
| 2006/0149818 A1 * | 7/2006 | Odell et al. .................... 709/206 |
| 2007/0025270 A1 * | 2/2007 | Sylvain .......................... 370/254 |
| 2007/0047516 A1 * | 3/2007 | Kottilingal ..................... 370/352 |
| 2007/0088831 A1 * | 4/2007 | Pallamreddy et al. ........ 709/227 |
| 2007/0160054 A1 * | 7/2007 | Shaffer et al. .............. 370/395.2 |

* cited by examiner

*Primary Examiner* — Patrice L Winder
*Assistant Examiner* — Ebrahim Golabbakhsh

(57) ABSTRACT

A method and system for associating concurrent communication sessions. First and second communication sessions are established. The first and second communication session correspond to a common user account and are active concurrently. The first and second communication sessions are associated with each other to share data between the first and second communication sessions. The first and second communication sessions can be data network and telephone communication sessions established by a web server and a telephony network server, respectively. An application server can connect the web server and the telephony server to associate the data network and telephone communication sessions and share data between the data network and telephone network communication sessions.

17 Claims, 2 Drawing Sheets

METHOD AND SYSTEM FOR ASSOCIATING CONCURRENT TELEPHONE AND DATA NETWORK SESSIONS

BACKGROUND OF THE INVENTION

The present invention is directed generally to data network and telephone based customer service systems. More specifically, the present invention is directed to associating concurrent data network and telephone communication sessions to share data between data network and telephone customer service systems during the concurrent communication sessions.

Many companies provide both telephone and data network ("web") applications for customers ("users") to access products and services. A telephone application can be an Interactive Voice Response (IVR) system to automatically interact with a user via a telephone call or an agent support system which is used by a customer service representative to assist a user via a telephone call. A web application is an application accessible by a user via a data network, such as the Internet. Typically a user uses a web browser to access a web application. Telephone and web applications are used to interact with customers in a variety of fields including, travel reservations (i.e., flights, hotels, rental cars), financial transactions (i.e., credit card billing, bank statements, stock purchasing), consumer products (i.e., books, music), etc.

Although many companies provide two modes (telephone and web) to access their products and services, the capabilities of the two modes are not equivalent. Therefore, certain transactions may be available using one of the modes and not the other. For example, in a case of an airline reservation system, a user may be able to make reservations using a user account on a web site of the airline or by calling a customer service representative. However, the user may only be able to change an existing reservation by calling the customer service representative. Furthermore, when a user concurrently uses both modes, changes made using one mode are not reflected in the other mode. For example, in the case of an airline reservation system, if a user communicates with a customer service representative via a telephone call to make changes in an itinerary, the user cannot view the changes being made by the customer service representative on the web site of the airline, while the changes are being made.

BRIEF SUMMARY OF THE INVENTION

The present invention provides a method and system of associating two separate concurrent communication sessions corresponding to a common user account. Accordingly, two separate communication sessions can be active at the same time and share data of an ongoing transaction.

In one embodiment of the present invention, first and second communication sessions corresponding to a user account are established. The first and second communication session can be a web session and a telephone session, respectively. When the first and second communication sessions are established, values of first and second communication session status fields for the user account are set to active. When the values of both of the first and second communication fields for a user account are set to active, the first and second communication sessions corresponding to the user account are automatically associated with each other such that data is shared between the first and second communication sessions.

In another embodiment of the present invention, a user can input a request to share data via a first communication session corresponding to a user account. In response to the user request, it is determined if a second communication session corresponding to the user account is active, and if active, the second communication session corresponding to the user account is associated with the first communication session corresponding to the user account to share data between the first and second communication sessions corresponding to the user account.

These and other advantages of the invention will be apparent to those of ordinary skill in the art by reference to the following detailed description and the accompanying drawings.

DETAILED DESCRIPTION

The present invention is directed to associating first and second concurrent communication sessions of a user using first and second communication modes, respectively. A communication mode is a type of application and network that provides access for a user to certain products and/or services. For example, the present invention can be implemented using a Web browser and data network in a "web" communication mode and a voice telephone and a telephone network (e.g., PSTN, VoIP, cellular) in a "telephone" communication mode. Telephone and web communication modes are used to interact with users in a variety of fields including, travel reservations (i.e., flights, hotels, rental cars), financial transactions (i.e., credit card billing, bank statements, stock purchasing), consumer products (i.e., books, music), etc. Although the present invention is described herein, using telephone and web communication modes, the present invention is not limited thereto. For example, a chat application can be used with a data network in a "chat" communication mode.

Figure 1:
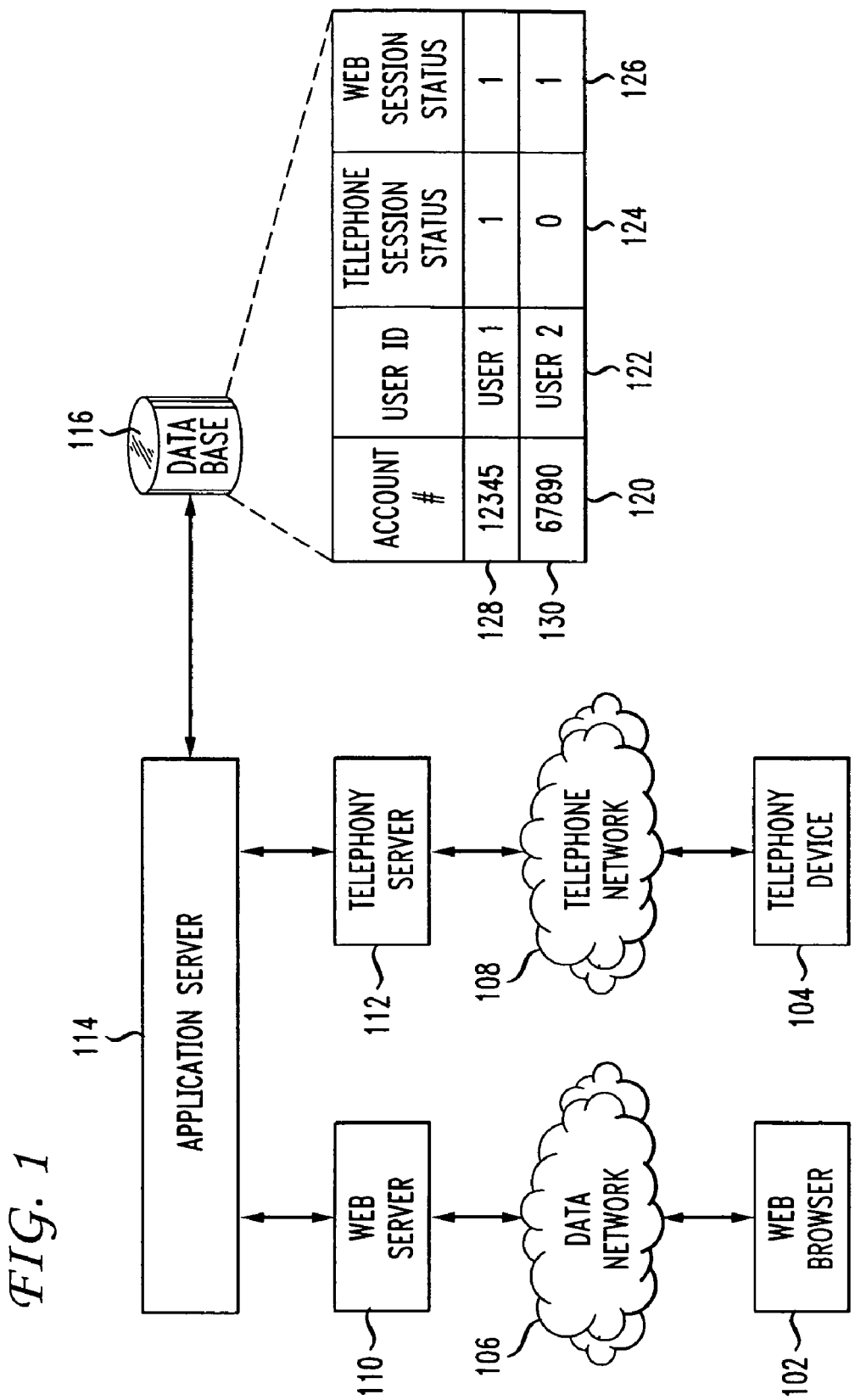
FIG. 1 illustrates a system configured to implement embodiments of the present invention.

FIG. 1 illustrates a system 100 configured to implement embodiments of the present invention. As illustrated in FIG. 1, the system 100 includes a web server 110 which is capable of implementing a web communication mode to establish a web session with a user, a telephony server 112 which is capable of implementing a telephone communication mode to establish a telephone session with a user, and an application server 114 which is capable of associating the web and telephone sessions for a user. The system 100 can also include a database 116.

The web server 110 is capable of communicating with a web browser 102 of a user via a data network 106, such as the Internet. The web server 110 may be implemented as an HTML server, a Java Enterprise server, a .Net server, or the like. The web server 110 runs a web application to establish a web session with a user. The web application allows the user to interact with the web server 110 through the web browser 102 to access various products and/or services. For example, the web application can provide the user with fillable forms, a virtual shopping cart, etc. The web browser 102 is an application running on a computer device of the user.

The telephony server 112 is capable of communicating with a telephony device 104 of a user via a telephone network 108. For example, the telephone network 108 can be a Public Switched Telephone Network (PSTN), a cellular network, or a Voice over Internet Protocol (VoIP) network. Accordingly, the telephony device 104 can be a Plain Old telephone Service (POTS) telephone, a cellular phone, or a VoIP client. If the telephony device 104 is a VoIP client, it is possible that the telephony device 104 is the same computer device that runs the web browser 102. The telephony server 112 runs a telephone application to establish a telephone session with a user.

The telephone application server 112 can be an Interactive Voice Response (IVR) system or an agent support system. An IVR system is an automated system which interacts with a user via a phone call. The IVR system is capable of receiving input signals from the user via the phone call. For example, the input signals can be dual tone multi-frequency (DTMF) signals corresponding to digits input from user's keypad or voice commands spoken by a user. The IVR system uses words and phrases stored in a database to respond to the input signals. An agent support system is a computer application used by a live customer service representative (CSR) who communicates with a user via a phone call. For example, the agent support system can include a graphical user interface running on a desktop computer system of the CSR.

Figure 2:
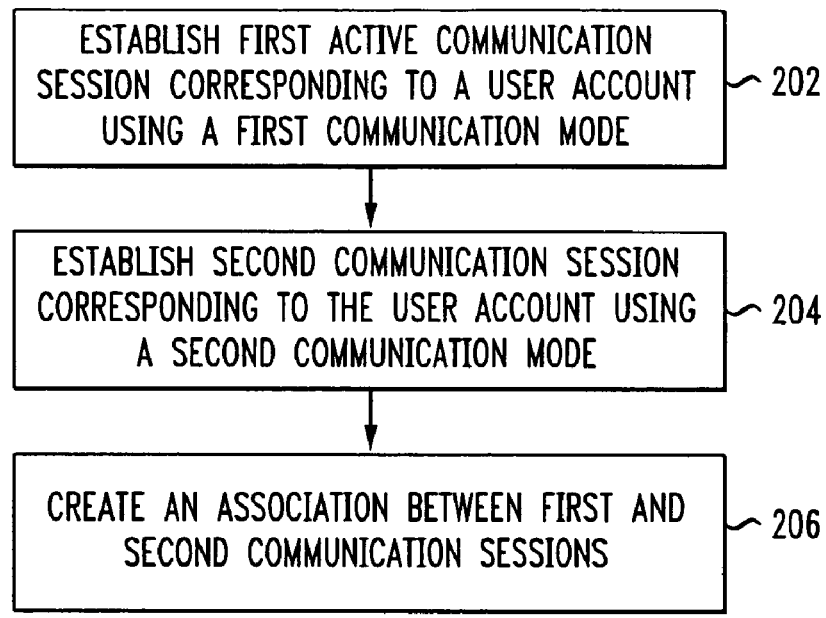
FIG. 2 illustrates a method of associating concurrent communication sessions according to an embodiment of the present invention.

FIG. 2 illustrates a method of associating concurrent communication sessions according to an embodiment of the present invention. This method will be described while referring to FIGS. 1 and 2. The method will be explained using an example of an airline reservation system.

At step 202, a first communication session corresponding to a user account is established using a first communication mode. For example, a user who wishes to change an existing airline reservation places a telephone call to a specified number of the reservation system using the telephony device 104. The telephone call is answered by the telephone application running on the telephony server 112. As described above, the telephone application can be an IVR system or a live CSR using an agent support system. The user is identified with a user account. The user may be required to input or speak account information, such as an account number and a password, in order to initiate a telephone session. The application server 114 receives this account information and finds the corresponding user account in the database 116. The database 116 can contain multiple records, with each record comprising multiple fields. Field 120 identifies the account number of a user, and field 122 identifies a user ID of a user.

When the first communication session corresponding to the user account is established a first communication session status field stored in the database 116 is set to indicate that the first communication session is active. For example, when a telephone session is initiated by the user, a telephone session status field 124 is set to indicate an active telephone session. The telephone session status field 124 can be set to a value of "1" to indicate an active telephone session.

At step 204, a second communication session corresponding to the user account is established using a second communication mode. For example, the user can initiate a web session by using the web browser 102 to log onto the airline reservations company's web site using the same account as is being used in the telephone session. The application server 114 receives the account information from the web server 110 and finds the corresponding user account in the database 114.

When the second communication session corresponding to the user account is established, a second communication session status field stored in the database 116 is set to indicate that the second communication session is active. For example, when the web session is initiated by the user, a web session status field 126 is set to indicate an active web session. The web session status field 126 can be set to a value of "1" to indicate an active web session.

As illustrated in FIG. 1, records 128 and 130 show exemplary records which may be stored in the database 116. For example, record 128 indicates that user1 with account number 12345 is involved in an active telephone session and an active web session. Record 130 indicates that user2 with account number 67890 is involved in an active web session, but not an active telephone session.

The application server 114 can monitor the communication session status fields stored in the database 116. When the application server detects that the first and second communication session status fields of a user account are both set to indicate active communication sessions, the application server 114 creates an association between the first and second communication sessions. This allows the first and second communication sessions to share data while the first and second communication sessions are both active. As illustrated in FIG. 1, the web server 110 and the telephony server 112 are connected through the application server 114. Thus, when the application server 114 creates an association between a web session active on the web server 110 and a telephone session active on the telephony server 112, the web session and the telephone session can share data with each other through the application server 114. For example, in the case of the airline reservation system, the user can give instructions regarding changing a reservation via the telephone session, and see a visual presentation of a new itinerary corresponding to the instructions immediately via the web session. Accordingly, the user can view the new itinerary before confirming the instructions. Similarly any information added or changed using the web session is available immediately for the CSR on the agent support system or is shared with the IVR for further action or spoken presentation.

The association in effect "gives permission" for data to be shared between the first and second communication sessions. This permission is used so that random communication sessions cannot access one another. The association also provides a pointer to each communication session which indicates where data can be found in the other communication session. For example, if a piece of information entered via the web session is needed by the CSR on the agent support system, the pointer indicates to the agent support system where to find that information in the memory of or on a disk of the web server 110. It is possible that this pointer be in the form of an Application Programming Interface (API), which is made available for accessing the data of a communication session once permission has been granted to access the communication session, instead of an actual software pointer, but the present invention is not limited thereto.

Although in the above example, the telephone session was established before the web session, but the present invention is not limited thereto. The web session can be established before the telephone session, or the telephone and web sessions can be established at the same time.

As described above, the application server 114 creates an association between the web server 110 and the telephony server 112. However, according to another embodiment of the present invention, it is possible that a web server and a telephony server be configured to interact without a separate application server. In this case, when a communication session corresponding to a user account is established using one of the web server and the telephony server, the communicating server queries the other server to determine if another communication session corresponding to the same user account is active. The web server and the telephony server of this embodiment can be connected to each other to communicate and share data directly with each other.

As described above, the communication session status fields are stored in the database 116 with other account information, but the present invention is not limited thereto. The communication session status fields may be stored in a separate database or in a temporary storage of the application server 114, the web server 110, or the telephony server 112. It is also possible that instead of storing communication session status fields, the application server 114 receives a signal corresponding to each active communication session that is established and creates an association between communication sessions when signals corresponding to two communication sessions of the same user account are received.

According to an alternate embodiment of the present invention, web and telephone sessions corresponding to the same user account are associated in response to a user request. In this embodiment a user can input a request to share information via either one of the web and telephone sessions. For example, the web application can include a link or a button displayed on the user's web browser 102 to allow the user to easily input the request to share information with a concurrent telephone session. When a request to share information is input via a web session corresponding to a user account, the application server 114 receives the request and queries the telephony server 112 to find an active telephone session corresponding to the same user account. The application server 112 then creates an association between the corresponding telephone and web sessions such that data is shared between the corresponding telephone and web sessions.

Similarly, the telephone application can provide a function to allow a user to easily input a request to share information with a concurrent web session. For example, an agent support system can include an option to share information displayed on a graphical user interface. The CSR can select the option to share information on the graphical user interface in response to a verbal request from the user. If the telephone application is an IVR, the user can input the request to share information in the form of DTMF digits or a voice command. When a request to share information is input via a telephone session corresponding to a user account, the application server 114 receives the request and queries the web server 110 to find an active web session corresponding to the same user account. The application server 114 then creates an association between the corresponding telephone and web sessions such that data is shared between the corresponding telephone and web sessions.

In order to achieve a higher level of security, it is possible to supply the user with a temporary password in response to a request to share information. The user receives the temporary password via the communication session used to input the request. The user then inputs the temporary password via the other communication session, and an association is created between the communication sessions. For example, if the user inputs a request to share information via a web session, the application server 114 generates a temporary password and the web application displays the temporary password on the web browser 102 of the user. The user can input the temporary password via a telephone session using DTMF digits or a voice command. The application server 114 receives the input temporary password from the telephony server 112 and creates an association between the web session that displayed the temporary password and the telephone session used to input the temporary password.

Similarly, if the user inputs a request to share information via a telephony session, the application server 114 generates a temporary password and the telephone application supplies the temporary password to the user. In the case of an agent support system, the temporary password can be displayed on the graphical user interface of a CSR, and the CSR can tell the user the temporary password. In the case of an IVR, the IVR speaks the temporary password to the user. The user can input the temporary password via a web session. The application server receives the input temporary password from the web server 110 and creates an association between the telephony session that supplied the temporary password to the user and the web session used to input the temporary password.

According to an embodiment of the present invention, the temporary password can be used as an additional security measure to a user account number. In this case, the application server 114 creates an association between a web session and a telephone session only if the web session and the telephone session correspond to the same user account and a temporary password presented to the user via one of the web session and telephone session is input by the user via the other one of the telephone session and the web session.

As described above, various security measures can be implemented before creating an association between a web session and a telephone session. According to an embodiment of the present invention, one or more of the security measures can be skipped when requesting an association between a particular pair of devices that have previously been associated. For example, if a telephone session using a telephony device 104 having a specific telephone number is successfully associated with a web session using a web browser 102 on a specific PC, the details of the association can be stored at the PC in the form of internet cookies. An internet cookie is a piece of text containing information that the web server 110 sends to the web browser 102 to store on the PC. The information in an internet cookie can be retrieved by the web server 110 when the web browser 102 communicates with the web server 110. The cookies can include the telephone number of the telephone 104. The next time a user attempts to associate web and telephone sessions using the web browser 102 on the PC and the telephone 104, if the cookies exist that confirm the previous association using the same devices, one or more security measure, such as requiring a temporary password, can be skipped.

In some fields to which the present invention applies, a third party may act as an intermediary between a company's system and a user. For example, in the case of an airline reservation system, a travel agent can initiate a telephone session with the airline reservation system to modify a user's reservation. In this case, the telephone application can provide a third party login to allow the travel agent to enter the account information of the user and establish a third party association. It is possible that a third party association shares some information between the telephone session and a web session, but not all information. For example, the third may party may not be able to view credit card or other financial information of the user. Furthermore, when a third party is communicating via a telephone session, the user can initiate a web session. Because the third party has entered the user account information, an association is created between the web session of the user and the telephone session of the third party. Accordingly, in the web session, the user can view changes made by the third party via the telephone session.

Figure 3:
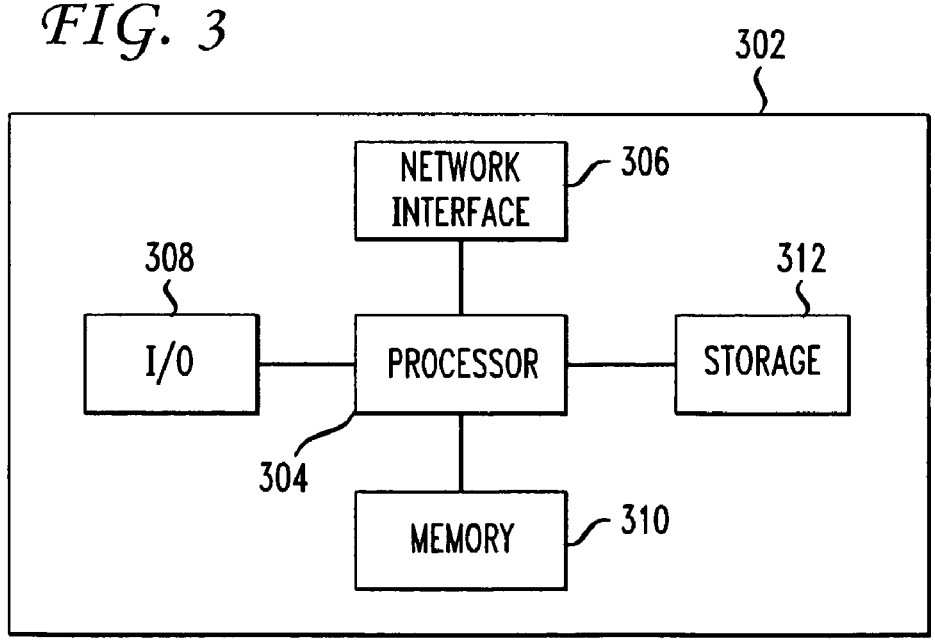
FIG. 3 illustrates a high level block diagram of a computer capable of implementing the present invention.

The method of associating concurrent communication sessions as described herein may be implemented at an application server. The application server can be implemented on a computer using well known computer processors, memory units, storage devices, computer software, and other components. According to another embodiment of the present invention, the method of associating concurrent communication sessions can be implemented at a web server and a telephone server without an application server. The web server and the application server can also be implemented on a computer (or separate computers) using well known computer processors, memory units, storage devices, computer software, and other components. A high level block diagram of such a computer is illustrated in FIG. 3. Computer 302 contains a processor 304 which controls the overall operation of the computer 302 by executing computer program instructions which define such operation. The computer program instructions may be stored in a storage device 312 (e.g., magnetic disk) and loaded into memory 310 when execution of the computer program instructions is desired. Thus, the method of associating the communication sessions can be defined by the computer program instructions stored in the memory 310 and/or storage 312 and controlled by the processor 304 executing the computer program instructions. The computer 302 also includes one or more network interfaces 306 for communicating with other devices via a network. The computer 302 also includes input/output 308 which represents devices which allow for user interaction with the computer 302 (e.g., display, keyboard, mouse, speakers, buttons, etc.) One skilled in the art will recognize that an implementation of an actual computer will contain other components as well, and that FIG. 3 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method comprising:
    establishing a first communication session corresponding to a user account using a first communication mode;
    establishing a second communication session corresponding to the user account using a second communication mode; and
    associating, by an application server, the first communication session and the second communication session with each other;
    sharing data between the first communication session and the second communication session;
    setting a first value of a first communication session status field corresponding to the user account as active when the first communication session is established;
    setting a second value of a second communication session status field corresponding to the user account as active when the second communication session is established; and
    monitoring the first communication session status field and the second communication session status field to detect whether the first value and the second value are both set to active;
    wherein the associating the first communication session and the second communication session with each other comprises automatically associating the first communication session and the second communication session in response to detecting that the first value and the second value are both set to active.

2. The method of claim 1, wherein the first active communication session is a data network communication session and the second active communication session is a telephone communication session.

3. The method of claim 1, wherein the associating the first communication session and the second communication session with each other comprises:
    associating the first communication session and the second communication session with each other in response to a user request.

4. The method of claim 1, further comprising:
    receiving a user request via the first communication session to share data with the second communication session;
    supplying a temporary password to a user via the first communication session; and
    receiving user input via the second communication session.

5. The method of claim 4, wherein the associating the first communication session and the second communication session with each other comprises:
    associating the first communication session and the second communication session when the user input received via the second communication session corresponds to the temporary password supplied via the first communication session.

6. The method of claim 1, wherein the first communication session and the second communication session are concurrent.

7. The method of claim 1, wherein the first communication session comprises a data network communication session with a computer device and the second communication session comprises a telephone communication session with a telephone device, further comprising:
    storing cookies containing information regarding the association between the data network communication session and the telephone communication session at the computer device; and
    retrieving the cookies when a subsequent data network communication session is established with the computer device.

8. The method of claim 7, wherein the information comprises a telephone number of the telephone device.

9. The method of claim 1, further comprising:
    associating a third party communication session with the first communication session and the second communication session; and
    sharing data between the third party communication session and the first communication session and the second communication session.

10. A system comprising:
    means for establishing a first communication session corresponding to a user account;
    means for establishing a second communication session corresponding to the user account; and
    an application server configured to associate the first communication session and the second communication session corresponding to the user account and to share data between the first and second communication sessions;
    means for setting a first value of a first communication session status field corresponding to the user account as active when the first communication session is established; and
    means for setting a second value of a second communication session status field corresponding to the user account as active when the second communication session is established;

wherein the application server is configured to monitor the first communication session status field and the second communication session status field to detect whether the first value and the second value are both set to active and automatically associate the first communication session and the second communication session in response to detecting that the first value and the second value are both set to active.

11. The system of claim 10, wherein the means for establishing a first communication session comprises:
a web server to establish a web session corresponding to the user account via a data network.

12. The system of claim 11, wherein the means for establishing a second communication session comprises:
a telephony server to establish a telephone session corresponding to the user account via a telephone network.

13. The system of claim 12, wherein the application server connects the web server and the telephony server.

14. A system, comprising:
a web server configured to establish web communication sessions corresponding to user accounts via a data network;
a telephony server configured to establish telephone communication sessions corresponding to user accounts via a telephone network;
an application server configured to:
connect the web server and the telephony server for associating a web communication session and a telephone communication session corresponding to the same user account and for sharing data between the associated web and telephone communication sessions;
set a first value of a first communication session status field corresponding to a user account as active when the web communication session is established; and
set a second value of a second communication session status field corresponding to a user account as active when the telephone communication session is established; and
monitor the first communication session status field and the second communication session status field to detect whether the first value and the second value are both set to active and automatically associate the web communication session and the telephone communication session corresponding to the same user account when the first value and the second value are both set to active.

15. The system of claim 14, further comprising:
a database configured to store account information regarding a plurality of user accounts.

16. The system of claim 15, wherein the account information comprises:
a web session status indicator for indicating whether a web communication session is active for a respective user account; and
a telephone session status indicator for indicating whether a telephone communication session is active for the respective user account.

17. The system of claim 14, wherein the telephone network comprises one of a Public Switched Telephone Network (PSTN), a cellular network, and a Voice over Internet Protocol (VoIP) network.

* * * * *